(12) United States Patent
Snapp

(10) Patent No.: US 7,590,544 B2
(45) Date of Patent: Sep. 15, 2009

(54) METHOD FOR CORRECTING A MAILING ADDRESS

(75) Inventor: Robert F. Snapp, Memphis, TN (US)

(73) Assignee: United States Postal Service, Washington, DC (US)

( * ) Notice: Subject to any disclaimer, the term of this patent is extended or adjusted under 35 U.S.C. 154(b) by 713 days.

(21) Appl. No.: 10/384,915

(22) Filed: Mar. 6, 2003

(65) Prior Publication Data

US 2003/0182018 A1 Sep. 25, 2003

Related U.S. Application Data

(60) Provisional application No. 60/362,174, filed on Mar. 6, 2002.

(51) Int. Cl.
*G06Q 10/00* (2006.01)
*G06F 17/00* (2006.01)

(52) U.S. Cl. .............................. 705/1; 705/401; 705/406

(58) Field of Classification Search ................. 705/400, 705/1, 401, 406
See application file for complete search history.

(56) References Cited

U.S. PATENT DOCUMENTS

| 5,387,783 | A | * | 2/1995 | Mihm et al. ................. 235/375 |
| 5,452,203 | A | * | 9/1995 | Moore ......................... 707/200 |
| 5,734,568 | A |   | 3/1998 | Borgendale et al. |
| 5,781,634 | A | * | 7/1998 | Cordery et al. ............... 705/60 |
| 5,925,864 | A |   | 7/1999 | Sansone et al. |
| 5,930,796 | A | * | 7/1999 | Pierce et al. ................. 707/100 |
| 6,457,012 | B1 | * | 9/2002 | Jatkowski .................... 707/101 |
| 6,557,000 | B1 | * | 4/2003 | Seestrom et al. ............. 707/100 |
| 6,865,561 | B1 | * | 3/2005 | Allport et al. ................ 705/406 |
| 7,031,959 | B2 | * | 4/2006 | Garner et al. .................. 707/3 |
| 2002/0059142 | A1 |   | 5/2002 | Krause et al. |
| 2002/0128954 | A1 | * | 9/2002 | Evans ........................... 705/37 |
| 2002/0144155 | A1 | * | 10/2002 | Bate et al. .................... 713/201 |

FOREIGN PATENT DOCUMENTS

JP 411031192 A 2/1999

OTHER PUBLICATIONS

Feliu, Joseph M. et al., "The Address Management System: Improving Customer Information Flow", Winter 1994, Journal of End User Computing, V.6N.1, pp. 26-32.*
Maguire, Michael, "How a Fully Automated Mail Center Can Help Any Business", Aug. 1992, Office Systems, V.9N.8, pp. 44-51.*

* cited by examiner

*Primary Examiner*—John W Hayes
*Assistant Examiner*—Fadey S Jabr
(74) *Attorney, Agent, or Firm*—Jeffrey Weiss; Weiss & Moy, P.C.

(57) ABSTRACT

A method for the Postal Service to provide updated address information to its customers such as mass mailers. The method includes comparing information on old delivery point files with information on current delivery point files. The delivery point files include unique identifiers that are keyed to each delivery point. Thus a comparison of older and newer files identifies delivery points that have been changed by, for example, changes in street name or renumbering of address numbers. The comparison of files generates a file with updated delivery and address information. In modified format this updated address information can be made available to mass mailers so that mass mailers will have the most up-to-date address information for mailings.

3 Claims, 2 Drawing Sheets

METHOD FOR CORRECTING A MAILING ADDRESS

CROSS-REFERENCE TO RELATED APPLICATIONS

This application claims priority from U.S. Provisional Application No. 60/362,174 filed on Mar. 6, 2002 entitled "A Method for Correcting a Mail Address." The contents of the above application is relied upon and expressly incorporated by reference as if fully set forth herein.

STATEMENT REGARDING FEDERALLY SPONSORED RESEARCH OR DEVELOPMENT

The invention was made by an agency of the United States government or under a contract with an agency of the United States government, the United States Postal Service ("USPS" or "Postal Service"), an independent establishment of the executive branch of the U.S. government.

BACKGROUND OF THE INVENTION

1. Field of the Invention

This invention relates to a method of correcting a mailing address and more particularly to maintaining a correct, updated address list for mass mailing.

2. Description of the Related Art

The Postal Service processes and delivers millions of pieces of mail each year. The efficiency of the postal system is impacted when address information on a mailpiece is not correct. The mail system works most efficiently when a mailpiece is addressed exactly correctly, and it costs the USPS more money to deliver improperly addressed mailpieces.

Likewise, certain bulk mailers or mass mailers have a strong economic interest in seeing that they have the most up to date and accurate mailing information for its intended addressees. Improperly addressed items that do not reach the intended recipient are a direct lost cost to the mailer. Mailpieces that must be redirected may lose their timeliness and thus their effectiveness for the mailer.

Delivery service providers, including mail delivery providers such as the USPS, are also faced with certain challenges presented by customers who change address. Misdirected mail that arises when a customer relocates is a source of inefficiency to the entity sending the mail. Likewise the time and resources expended by the entity handling the mail also represent lost resources. The USPS for example handles millions of mailpiece items in a calendar year, and the inefficiency and waste associated with misdirected mail carries significant costs.

In addition to typical change of address occurrences occasioned by the move of an individual addressee, postal delivery addresses themselves may change. A postal delivery address, even though established, may have changes made, for example, to the street name, the secondary information like apartment numbers, or even the ZIP code or the plus four add-on.

The intelligent ZIP+4 (IZ4) can use the Delivery Point Bar Code (DPBC) from a ZIP+4 reference product and maintain updates or changes to that record.

As is currently known, a mailer, or anyone with an address list, can run the address list through a reference database product. The current address database product assigns the correct ZIP+4 code to a physical address and standardizes the addresses. This reference product is commonly referred to as a ZIP+4 engine. The ZIP+4 engine accepts street addresses with a city and state and attempts to match them against a database that has all possible addresses within that geographical area.

However, there are limitations to the ZIP+4 engine. For example, it does not verify that the address is correct. It merely indicates that the address is within the range of addresses on that street in that city. If the street name changes or a renumbering of any kind occurs, then the ZIP+4 engine may not make a match or may make an incorrect match and the owner of the address list may have corrupted the address.

The Postal Service estimates that there is quite a significant number of address changes that do occur. On an annual basis it is estimated that 20% of all postal addresses experience a change of some kind. The change may be to the physical address such as a street name, number or ZIP code. Also included within this number are changes that do not appear on the physical address, but are nonetheless important to mass mailers. This information includes items such as drop off points, equipment, and packaging information. Mailers use all of this information to efficiently communicate with their addressees.

Thus there is a need for an improved address correction method. The improved method should allow a mailer to check information on an address list for any changes to the postal delivery address. It is desired that a correction method would identify changes to postal addresses such as renamed streets, renumbering of apartments, or ZIP code changes.

It is further desired that an improved address correction method provide updated address information on a regular and periodic basis. In this way mailers can continuously update mailing lists when sending out mailings on a periodic basis.

It is also desired that an improved address correction method be made accessible to the mailing public through software and software applications now in use by mailers. In this way mailers can use the product without significant changes to data processing operations.

SUMMARY OF THE INVENTION

The present invention overcomes deficiencies in the prior art by providing an address correction method. The method of the present invention captures address changes such as changes due to street name changes, address renumbering or apartment renumbering.

The present method relies on information that is generated by the Postal Service on a weekly basis, and therefore the updated information can be made available on a periodic and regular basis.

It is an object of the invention to provide a method of correcting an address by obtaining an 11 digit Delivery Bar Code and validating the address against a Delivery Point Validation Table to obtain the specific Key ID code and making changes to the address for that specific Key ID code.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed. Thus, the present invention comprises a combination of features, steps, and advantages which enable it to overcome various deficiencies of the prior art. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

The accompanying drawings, which are incorporated in and constitute a part of the specification, illustrate several embodiments of the inventions and, together with the description, serve to explain the principles of the invention.

DETAILED DESCRIPTION OF THE PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

The present invention builds an address product that can be provided to customers who mail articles through a postal service such as the USPS. The customers can use the address product to correct mailing addresses in their possession. The address product arises in two sets of steps. In a first set of steps, the USPS internally creates an intelligent zip+4 table (sometimes referred to as the "IZ4" table). A second set of steps involves the customer using the IZ4 table to update its own mailing list.

We first describe the steps in a preferred method of creating the IZ4 table.

Figure 1:
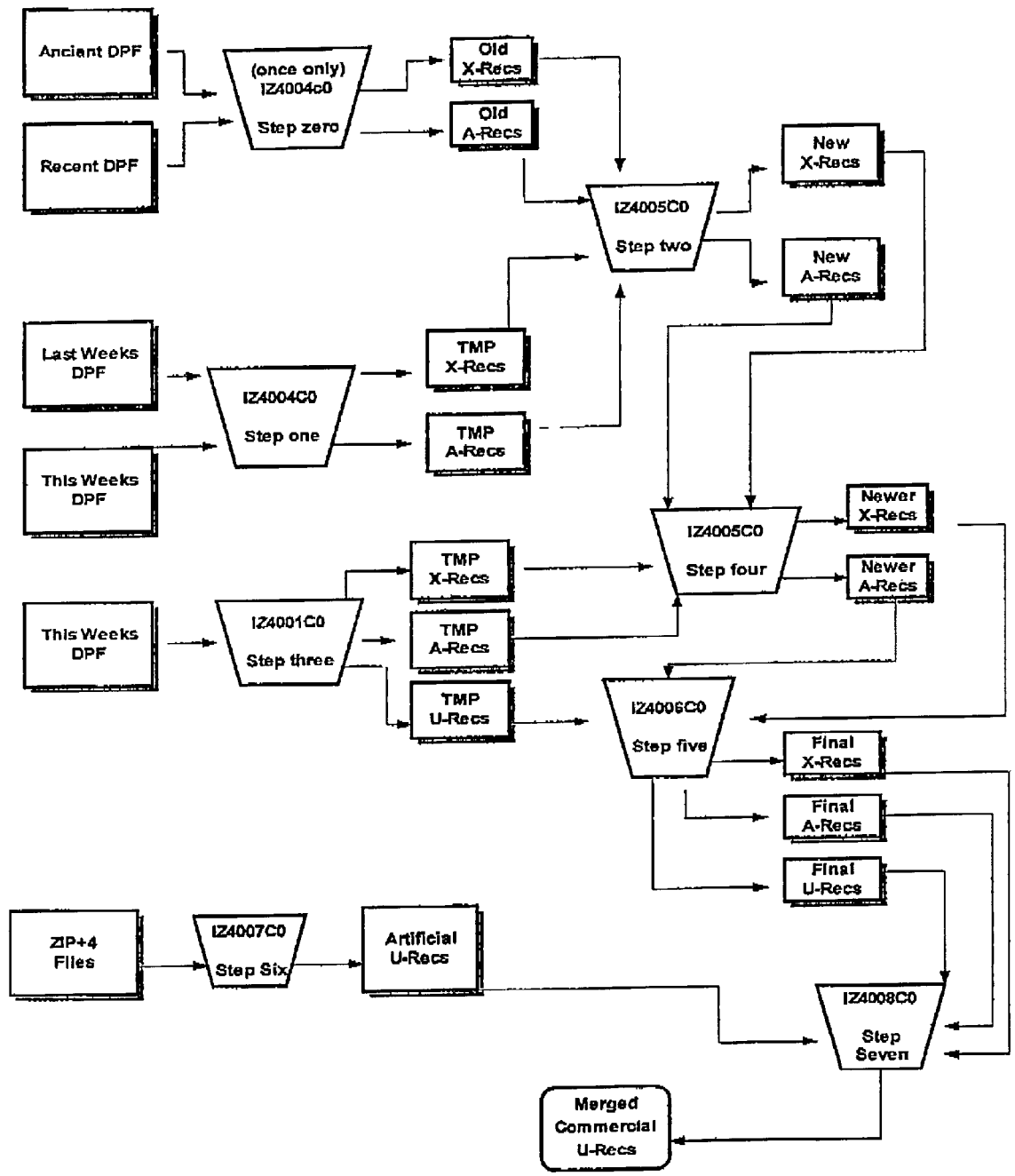
FIG. 1 depicts the flow chart for building the Intelligent Zip 4 product.

As shown in FIG. 1, building of the IZ4 product depends on the Master Delivery Sequence File or Delivery Point File (DPF). The DPF file contains all the known US Postal Service delivery points. Contained within it are the parsed addresses (addresses broken down by its components), the five digit ZIP code, the four digit ZIP code add-on, the delivery point code, and a Key ID code. The combination of these elements allows for a specific identification code for each physical address. The US Postal Service generates the data that create a DPF file on a weekly basis.

The information in the DPF file is typically referred to as a flat file rather than a database. The significance is that the data in the DPF file are not linked or related to one another. However, data within a DPF file related to a delivery point is constant. Thus, although the mailing representation of the physical address may change (street name change, address renumbering) the DPF constantly tracks the delivery point.

As shown in step one IZ4 compares a copy of last week's DPF file to a copy of this week's DPF file to identify changes to the record. From the comparison records are marked as Temporary Translation records (TMP X-Recs) or Temporary Ambiguous records (TMP A-Recs). Translation records are ones where there has been a change at a delivery point and the record can "translate" the old 11 digit delivery point bar code and street indicia to the new 11 digit DPBC and new indicia information. Ambiguous records are ones where two records (11 digit DPBC's) conflict with each other and new information can't be provided.

Also shown in FIG. 1 is a step comparing recent DPF with ancient DPF. Step zero. This is a start up procedure only. Once a baseline of DPF information has been established, each new week's DPF file is compared to the information from the last week's file.

After the TMP records are created they are compared to the already existing X-recs and A-recs from previously run IZ4. Step two. This step ensures that none of the TMP X-recs conflict with any existing records. The result is a new list of New X-recs and New A-recs. This list of New X-recs and New A-recs are combined with other TMP recs that were produced from the current week's DPF file. Step three. This list indicates which delivery points were added to or deleted from the file (not just changed as in the earlier compare process). Step four. These TMP and New recs are evaluated like they were originally to ensure there is not a conflict with each other. The result is the Newer X-recs and Newer A-recs. These records are combined with U-records made from this week's DPF file, de-conflicted then finalized to make Final X-recs, Final A-recs, and Final U-recs. U in this instance represents unambiguous. Steps five, six, and seven.

The final step in the commercial product is "hiding" the real delivery points. By law the US Postal Service is prohibited from providing a set of actual address data. Thus in order to create an address list that can be shared with the public, artificial names and addresses are added to the set of actual names and addresses. The number of valid names and addresses is in the order of 150 million. To this are added 350 to 400 million false addresses. Artificial U-recs are created that fill in block faces with non-delivery points. This also prevents hackers from getting an address list of all the actual US Postal Service delivery points. The IZ4 released for public use thus includes both real and artificial address information, thereby satisfying legal requirements.

Several steps in the above process involve comparing one data file to another data file. For example, once the process is in operation there will be a weekly run to compare the last week's DPF file with the new DPF file received for this week. A software application makes the comparison between the two files. The software may be any of the known comparison programs that have as their purpose comparison of data such as address information. The function of the software is to compare two sets of data for a given delivery point (last week's and this week's); where there is a conflict between them, the software selects this week's address information (the newer information). Depending on how the data is presented or configured, the comparison software may take different configurations. In FIG. 1 the software that the USPS uses is designated in the various steps as IZ400.

The previous discussion explained how an IZ4 file is created. We now explain how a customer of the Postal Service, for example a mass mailer, uses the IZ4 file to update its own mailing information.

Figure 2:
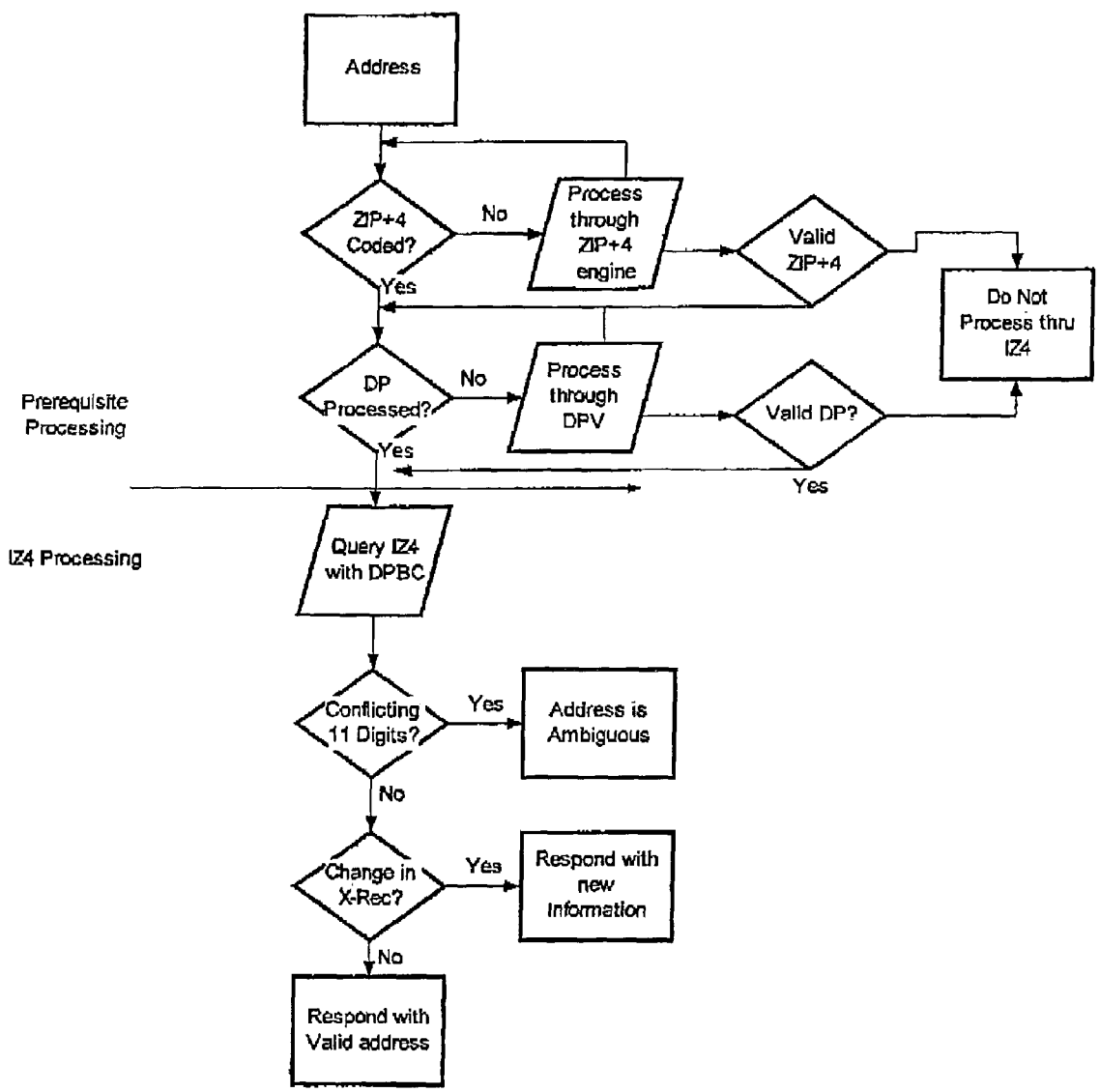
FIG. 2 depicts the flow chart for public use of the Intelligent Zip 4 process.

Use of the IZ4 is shown in FIG. 2. To use the Intelligent ZIP+4 the mailer uses a normal ZIP+4 engine to get an 11 digit DPBC and then validates the address against a Delivery Point Validation table. The delivery point validation verifies that the address is a US Postal Service delivery point. Each specific delivery point has a Key ID code assigned to that physical address. In this way when changes occur and are posted, such as a new street name is assigned or the ZIP code changes, the Key ID code won't change but all the indicia or mailing address information can be changed. IZ4 recognizes that changes have occurred and sends the mailer the new information with confidence that the mail will be delivered to the correct delivery point. When alternate forms of addressing components exist for a single physical delivery point, IZ4 returns the most preferred of the available choices. This will include, when appropriate, conversions from rural style addressing to city style addressing, preferred aliases, and proper standardized components. The mailer or owner of the address list can then make the changes in their database for future mailings.

The Intelligent Z4 has two prerequisites; the address has to have been ZIP+4 coded to obtain the 11 digit DPBC and that DPBC must have been Delivery Point Validated. Once that processing has been done, IZ4 can reprocess the list as often as once a week to keep up with changes or at a minimum of once every three months to keep current.

IZ4 is different from a ZIP+4 engine in two main aspects. The input of one is the output of the other and quickness of updates. The ZIP+4 product has as its input a street address with city and state and outputs a standardized USPS address with a 5 digit ZIP code and the 4 digit add-on and includes the delivery point code. (FIG. 2) By the nature of the policies surrounding the ZIP+4 product, it can be used up to 180 days after it was created. The IZ4 is a weekly product and can be kept much more current.

An example of the input and result differences with the ZIP+4 and the IZ4 products is shown at FIG. 2 where a known address has a change in the indicia: 123 Main Street, Collierville Tenn. is changed to 123 Elvis Presley Blvd, Collierville Tenn. An updated ZIP+4 engine product will not correct this type of change since the input information is different. The delivery point itself has not changed only the address indicia. IZ4 can track the delivery point and return the corrected 123 Elvis Presley Blvd when presented with 38017-1234-23. Likewise if any other part of the street address components change (the city name, the street number, the ZIP Code, or the Add-on), IZ4 will respond with the new information when given the old.

IZ4 responds with "Ambiguous" when there is a conflict with the 11 digit DPBC. Ambiguous happens in several ways. If the 11 digit DPBC is the default record for a high rise building with multiple delivery points, IZ4 cannot determine which delivery point is really being queried. Also If a ZIP Code or the Plus Four add-on had been deleted then is re-used for a different delivery point later, the old designation for the 11 digit DPBC and the new designation will be in conflict. The IZ4 product can be used for address list maintenance. Mailers or owners of large mailing lists spend millions of dollars in postage and fees for returned "Undeliverable As Addressed" (UAA) mail. The IZ4 product keeps their list updated with the latest correct address. Other embodiments consistent with the present invention will be apparent to those skilled in the art from consideration of the specification and practice of this invention disclosed herein. It is intended that the specification and examples be considered exemplary only, with the true scope of the invention being indicated by the following claim and equivalents.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. One of ordinary skill in the art will recognize that the process just described may easily have steps added, taken away, or modified without departing from the principles of the present invention. Accordingly, the scope of protection is not limited to the embodiments described herein, but is only limited by the claims which follow, the scope of which shall include all equivalents of the subject matter of the claims.

What is claimed is:

1. A method for correcting customer address lists comprising the computer implemented steps of:

providing an old delivery point file having a first plurality of entries wherein each entry includes address information associated with a unique delivery point and a unique code associated with the unique delivery point;

providing a new delivery point file having a second plurality of entries wherein each entry includes address information associated with a unique delivery point and a unique code associated with the unique delivery point comparing the first plurality of entries to the second plurality of entries and associated delivery points and codes;

for each match between the unique codes in the old and new delivery point files, generating an entry in an updated address file that contains the address information from the new delivery point files that are associated with the matching unique code;

wherein such generation occurs even where the address information in the old and new delivery point files do not match, provided that the unique matching codes do match;

for each unique code in the new delivery point file that is unmatched in the old delivery point file, generating an entry in the updated address file that contains the address information from the new delivery point file that is associated with the unmatched unique code; and for each unique code in the old delivery point file that is unmatched in the new delivery point file, generating an entry in the updated address file that contains:

the address information from the old delivery point file that is associated with the unmatched unique code; and an indicator that the corresponding address information from the old delivery point file is invalid; and wherein the old and new delivery point files contain the unique delivery points for changed and unchanged address information.

2. The method as defined in claim 1, wherein the address information in the old delivery point file differs from the address information in the new delivery point file by data selected from the group consisting of: a delivery point bar code; a street name; an address number; occupant name; Post Office Box; resident name; a ZIP code; an apartment number; a city; a state; governmental postal jurisdiction name; and a combination of the foregoing.

3. The method as defined in claim 1, further comprising generating an entry in the updated address file that contains fictitious address information that is unassociated with any said unique delivery point and is different than any other said entry in the updated address file.

* * * * *